US008780501B2

(12) United States Patent
Kuwajima

(10) Patent No.: US 8,780,501 B2
(45) Date of Patent: Jul. 15, 2014

(54) HEAD SUPPORT MECHANISM WITH COUNTER BALANCE AND CENTROID ADJUSTMENT PADS

(75) Inventor: Hideki Kuwajima, Tokyo (JP)

(73) Assignee: TDK Corporation, Tokyo (JP)

( * ) Notice: Subject to any disclaimer, the term of this patent is extended or adjusted under 35 U.S.C. 154(b) by 140 days.

(21) Appl. No.: 13/456,697

(22) Filed: Apr. 26, 2012

(65) Prior Publication Data

US 2012/0287536 A1 Nov. 15, 2012

(30) Foreign Application Priority Data

May 11, 2011 (JP) .................................. 2011-105775

(51) Int. Cl.
*G11B 5/48* (2006.01)
*G11B 21/16* (2006.01)

(52) U.S. Cl.
USPC .................................... 360/245.3; 360/245.7

(58) Field of Classification Search
CPC ........... G11B 2005/0021; G11B 5/482; G11B 5/4826; G11B 5/4833
USPC .................. 360/245, 245.1, 245.3, 245.7
See application file for complete search history.

(56) References Cited

U.S. PATENT DOCUMENTS

| | | | | |
|---|---|---|---|---|
| 4,922,356 A | * | 5/1990 | Yamaguchi et al. | 360/245.4 |
| 5,142,424 A | * | 8/1992 | Hatamura | 360/244.2 |
| 5,237,475 A | * | 8/1993 | Kazama et al. | 369/13.17 |
| 5,243,482 A | * | 9/1993 | Yamaguchi et al. | 360/245.4 |
| 5,751,515 A | * | 5/1998 | Kasahara | 360/236.9 |
| 5,929,326 A | * | 7/1999 | Imaino et al. | 73/105 |
| 6,859,344 B2 | * | 2/2005 | Kawauchi et al. | 360/234.3 |
| 6,940,694 B2 | * | 9/2005 | Ohwe et al. | 360/234.6 |
| 7,061,722 B2 | * | 6/2006 | Kohira et al. | 360/245.1 |
| 7,230,798 B2 | * | 6/2007 | Hashi et al. | 360/244.2 |
| 8,107,198 B1 | * | 1/2012 | Ee | 360/245.7 |
| 8,134,803 B2 | * | 3/2012 | Harris et al. | 360/245.3 |
| 8,169,745 B2 | * | 5/2012 | Yao et al. | 360/245 |
| 8,184,403 B2 | | 5/2012 | Fuchino | |
| 8,223,460 B2 | * | 7/2012 | Thaveeprungsriporn et al. | 360/244.9 |
| 2002/0051323 A1 | * | 5/2002 | Rancour et al. | 360/245.3 |
| 2005/0174695 A1 | * | 8/2005 | Suk | 360/245.7 |
| 2008/0192383 A1 | * | 8/2008 | Takasugi et al. | 360/244.2 |
| 2008/0239577 A1 | * | 10/2008 | Zeng et al. | 360/245.1 |
| 2012/0287536 A1 | * | 11/2012 | Kuwajima | 360/234.3 |

FOREIGN PATENT DOCUMENTS

| | | |
|---|---|---|
| JP | A-02-227886 | 9/1990 |
| JP | A-2002-324374 | 11/2002 |
| JP | 2009-016027 A | 1/2009 |
| WO | 2010-046980 A1 | 4/2010 |

OTHER PUBLICATIONS

Office Action mailed May 17, 2013 in corresponding JP Application No. 2011-105775 (and English translation).

* cited by examiner

*Primary Examiner* — Brian Miller
(74) *Attorney, Agent, or Firm* — Posz Law Group, PLC

(57) ABSTRACT

A head support mechanism includes a slider on which a head element is mounted is arranged at a tip end part of a load beam. The head support mechanism includes a support projection arranged at the tip end part of the load beam, a gimbal part including the slider and arranged to support the slider in a revolvable manner around the support projection, a displacement member arranged to revolve the slider around the support projection, and a counter balance aligned along a symmetric axis of the gimbal part so as to align a centroid of the gimbal part including the slider with the support projection.

5 Claims, 19 Drawing Sheets

HEAD SUPPORT MECHANISM WITH COUNTER BALANCE AND CENTROID ADJUSTMENT PADS

TECHNICAL FIELD

The present invention relates to a head support mechanism arranged at a magnetic disk device.

BACKGROUND OF THE INVENTION

The present invention is related to a head support mechanism that is arranged in a disk device such as a magnetic disk or the like that is used as a memory device of computers, and more particularly to a head support mechanism best suited for achieving high recording density of data in the magnetic disk device. In recent years a recording density of a magnetic disk that is used for a magnetic disk device has been remarkably and progressively increasing. A magnetic head that is used for recording data to and/or for reproducing data of a magnetic disk is normally arranged at a slider, and the slider at which the magnetic head is mounted is supported by a head support mechanism arranged in the magnetic disk device. The head support mechanism is arranged at a head support arm, and the head support arm is arranged such as to be revolvable by a voice coil motor (VCM).

In order to record data to a magnetic disk with even higher density, it is necessary to position the magnetic head with respect to the magnetic disk with a higher degree of precision. In order to achieve the precision, a head support mechanism for positioning a magnetic head with high precision has already been proposed (see JP Laid-Open Patent Publication No. H2-227886).

Also, JP Laid-Open Patent Publication No. 2002-324374 discloses a method in which a slider revolves centering a support projection while a load beam is in a stationary state. The above identified document also discloses a configuration of counter balances which, so as to align a center of inertia of a revolving portion including the slider with the support projection, are portions of a slider retaining plate, arranged at both tip ends of the slider retaining plate, and are arranged in a line-symmetric manner with respect to a central axis passing through the support projection of the load beam. With such configuration, the axis of inertia of the slider rotary portion including the slider retaining plate substantially aligns with the support projection. With such configuration, when the slider separates from a disk by lifting against a negative pressure coming from an air bearing of the slider, an orientation of the slider is stabilized.

However, the above stated conventional configuration has been problematic in that counterforce generated when the slider is slightly displaced by a pair of displacement members excites a resonance at a resonant frequency of the load beam, thereby not allowing a high speed positioning of the magnetic head with respect to a predetermined track on a disk.

Further, the method disclosed in JP Laid-Open Patent Publication No. 2002-324374 has been problematic also in that since the inertial mass of the rotary portion including the slider becomes great, the resonant frequency of a rotation mode of the slider is not allowed to be increased. Furthermore, the method identified above causes a necessity to accurately adjust a centroid of the rotary portion in order not to excite the resonance at the resonant frequency of the load beam. Also, since the counter balance according to the configurations identified above is shaped such as to bulge outwardly from both sides of the head support mechanism, a wind generated by the rotation of the disk greatly influences a head positioning performance.

The conventional configurations has been problematic in that the counterforce, the force being generated when the slider is slightly displaced by the pair of displacement members, excites a resonance (referred to as a SWAY mode) at a resonant frequency of the load beam, causing unnecessary vibration for the load beam, and it becomes impossible to position the head at a high speed with respect to a track on the disk. Further, it is desirable that, in order to allow the high speed positioning of the head without receiving unnecessary resonance due to the influence of the wind generated by the high-speed rotation of the disk, the resonant frequency of the slider rotation mode which combines the slider and the gimbal part is increased. The present invention is, in light of the above mentioned issues, intended to provide a head support mechanism operable to suppress unnecessary resonance while allowing high responsiveness in precision positioning of the head.

SUMMARY

In order to achieve the above objectives, a head support mechanism of the present invention includes a slider on which a head element is mounted is arranged at a tip end part of a load beam. The head support mechanism includes a support projection arranged at the tip end part of the load beam, a gimbal part including the slider and arranged to support the slider in a revolvable manner around the support projection, a displacement member arranged to revolve the slider around the support projection, and a counter balance aligned along a symmetric axis of the gimbal part so as to align a centroid of the gimbal part including the slider with the support projection.

By virtue of such configuration, it becomes possible to align the centroid of a revolving portion with a support projection so as not to transmit the reaction of the revolving portion, which includes the slider which revolves by a displacement member and a gimbal part, while minimizing an inertia mass of the revolving portion. Further, it becomes possible to increase resonant frequency characteristics. Furthermore, it becomes possible to obtain a head support mechanism having a high responsiveness in precision positioning of a magnetic head or the like.

In order not to excite the SWAY mode of the load beam, which is one of the above identified two objectives, the objective is achieved by, firstly, arranging a counter balance (described below) of the present invention and by adjusting a distance from the support projection to the end of the counter balance. At this point, it is necessary to align the counter balance along a symmetric axis of the gimbal part such as to align a centroid of the gimbal part and the slider with the support projection (FIG. 11).

In order to increase the resonant frequency of the slider rotation mode which combines the slider and the gimbal part, which is the other objective of the above identified two objectives, the objective is achieved by reducing the inertia mass of the counter balance. In order to reduce the inertia mass, the counter balance should be arranged in the position as described in the present invention (FIG. 15).

In actual practice, since an operation frequency of the slider rotation is operable only when the same is lower than the resonant frequency of the slider rotation mode which combines the slider and the gimbal part, increasing the resonant frequency allows the operation frequency to be increased, thereby achieving the high speed positioning of the magnetic head with respect to the magnetic disk.

According to the present invention, by aligning the centroid of the gimbal part, which includes the slider with the support projection, the excitation of the SWAY mode of the load beam is prevented. Further, by arranging the counter balance, which is arranged to align the centroid of the gimbal part, along the symmetric axis of the gimbal part, the frequency of the rotation resonant of the revolving portion which includes the slider and the gimbal part is improved to be higher resonant frequency.

Further, by arranging a solder at the counter balance to adjust the centroid thereof, the influence of the SWAY mode is surely eliminated. By providing a head support mechanism having a higher resonant frequency, it becomes possible to allow a head element to track as desired at a higher speed, and to achieve a hard disk drive operable to record and reproduce data at a higher speed. Furthermore, by configuring a limiter mechanism with a portion of the counter balance, the configuration of the head support mechanism is further simplified. Additionally, by arranging the counter balance along the symmetric axis of the gimbal part, influences caused by the wind turbulence due to the rotation of the disk are greatly reduced.

The present invention is a head support mechanism with a slider including a head element is arranged at a tip end part of a load beam. By arranging a support projection arranged at the tip end part, a gimbal part arranged at a space between the slider and the load beam so as to support the slider in a manner rotatable about the support projection, a displacement member arranged to provide a rotating force to the slider along a plain surface direction to rotate about the support projection, and a counter balance arranged to align a centroid of the slider including the gimbal part during rotation with the support projection and to define a portion of the gimbal part arranged along a symmetric axis of the gimbal part, the head support mechanism is operable to not excite a natural vibration of the load beam so as to achieve high responsiveness in precision positioning of a magnetic head.

Further, according to the present invention, in order to allow an axis of inertia during rotation of the slider including a slider retaining plate to be accurately aligned with the support projection, by arranging a centroid adjustment mechanism arranged at the counter balance in order to align a centroid of the gimbal part, a centroid of a revolving portion can be finely adjusted so as not to transmit counterforce generated by the revolving portion, which include the slider arranged to rotate via the displacement member and the gimbal part, to a suspension. By such configuration, the head support mechanism operable to achieve high responsiveness in precision positioning of the magnetic head is obtained.

Further, the present invention is beneficial in that a limiter mechanism, which is arranged to raise the slider away from the disk when the slider unloads, is defined by a portion of the counter balance so as to allow the counter balance and the limiter mechanism to be arranged in a limited space.

The present invention is operable to not excite a resonance at a resonant frequency of the load beam, which is referred to as a SWAY mode, and suppress unnecessary vibrations. Further, by increasing a resonant frequency of the rotary portion, which combines the slider and the gimbal part, an influence of the wind generated by the high speed rotation of the disk will be reduced while unnecessary resonance will be suppressed. Consequently, the head support mechanism operable to achieve high responsiveness in precision positioning of the magnetic head is obtained.

DETAILED DESCRIPTION OF EMBODIMENTS

Hereinafter, referring to the figures, preferred embodiments of the present invention will be described. It should be noted that the present invention is not limited to the embodiments described below. Further, it should be noted that components described herein may be replaced with other components that are obvious to those skilled in the art and are substantially equal. Further, the components described below may be combined on an optional basis.

Figure 1:
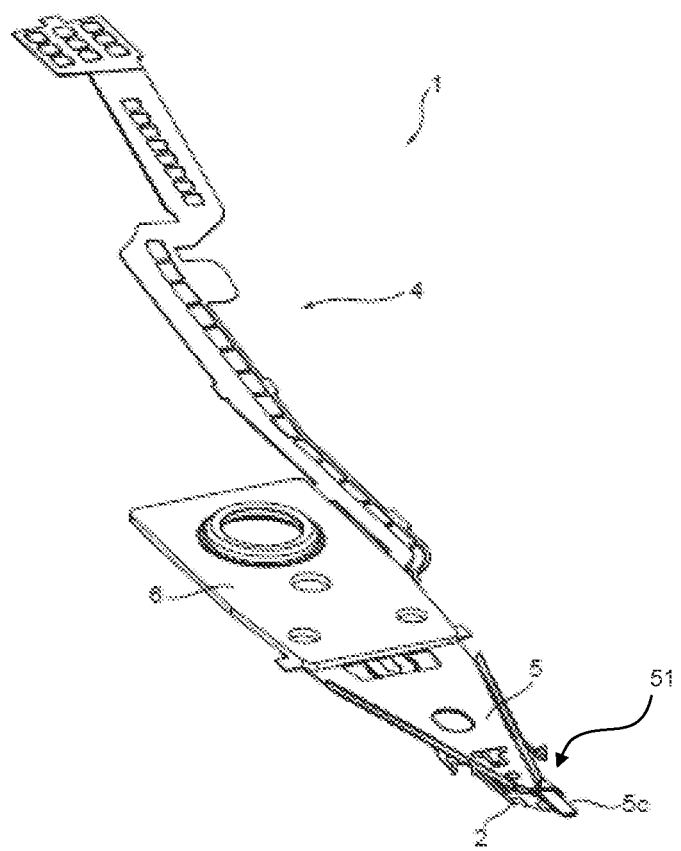
FIG. 1 is a general perspective view of a head support mechanism according to a first embodiment of the present invention.

FIG. 1 is a general perspective view of a head support mechanism 1 according to a first embodiment of the present invention. The head support mechanism 1 includes a slider 2, a load beam 5, a base plate 6, and a flexure 4 having a wire arranged to conduct a signal from a head. Also, a tip end part 51 of the load beam 5 includes a tab 5c that is arranged to move the slider 2 upward and downward.

Figure 2:
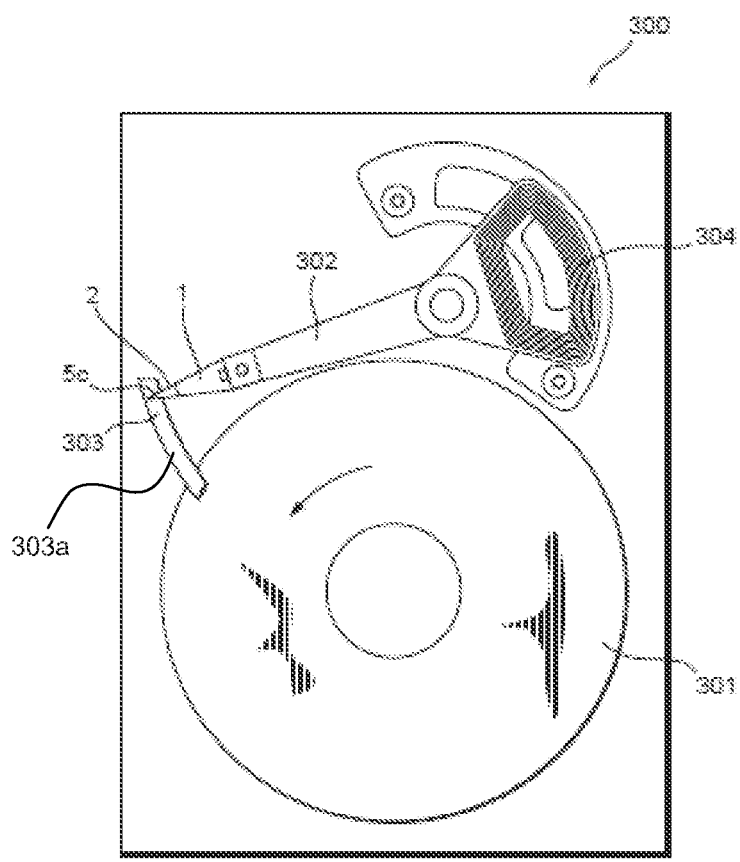
FIG. 2 is a schematic plan view of a hard disk drive having the head support mechanism according to the first embodiment of the present invention.

FIG. 2 is a schematic plan view of a magnetic disk device including the head support mechanism 1 of the first embodiment. A magnetic disk device 300 includes a magnetic disk 301 (hereafter, is occasionally referred to as disk 301), a voice coil motor 304, and a head support arm 302. The head support mechanism 1 is firmly attached at a tip end of the head support arm 302. The tab 5c is arranged at a tip end of the head support mechanism 1. While the disk 301 is in a non-motion state, the slider 2 is removed from the disk 301 by a ramp road 303 and the tab 5c. When the magnetic disk device 300 transitions into a motion state, current passes through the voice coil motor 304 and the head support arm 302 is revolved in a counter clockwise direction, and the tab 5c of the head support mechanism 1 is gradually lowered along an inclined surface 303a of the ramp road 303 so as to allow the slider 2 to smoothly load onto the disk 301. Also, when the magnetic disk device 300 finishes its motion, the head support arm 302 is revolved by the voice coil motor 304 in a clockwise direction so as to allow the slider 2 to smoothly unload from the disk 301.

Figure 3:
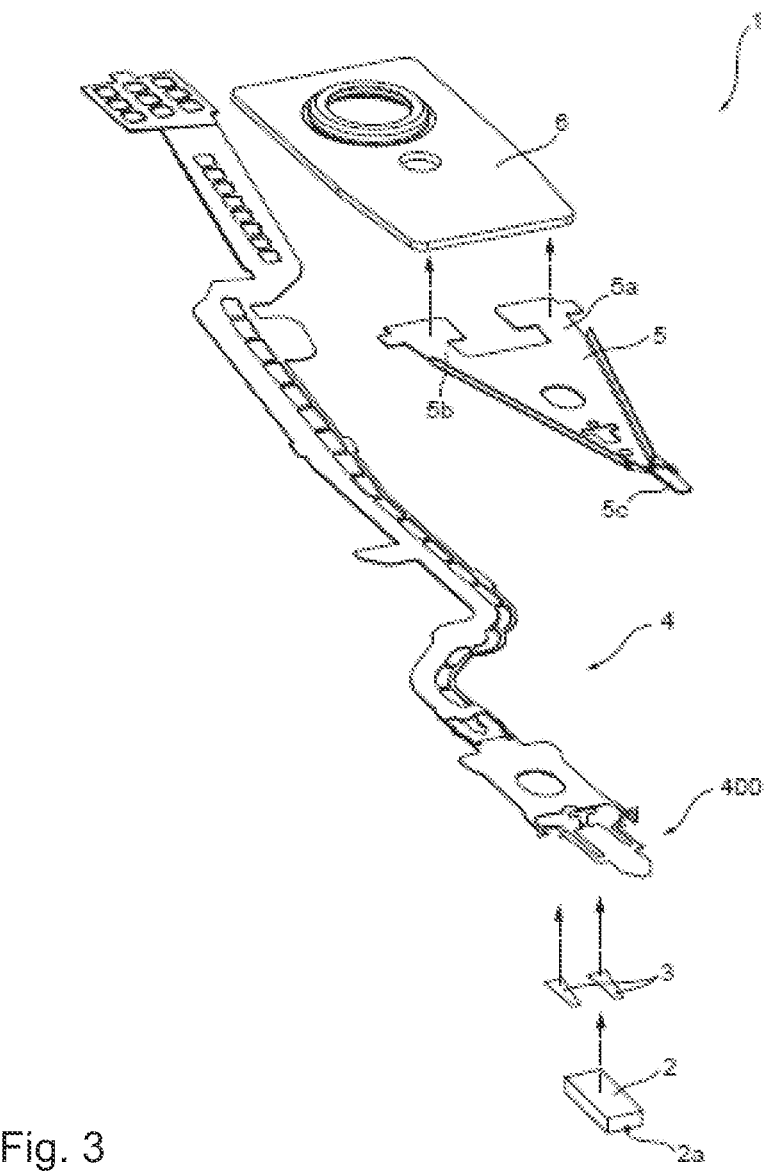
FIG. 3 is an exploded perspective view of the head support mechanism according to the first embodiment of the present invention.

FIG. 3 is an exploded perspective view of the head support mechanism 1 according to the first embodiment. The head support mechanism 1 includes the slider 2 having a head element 2a, a pair of piezoelectric elements 3 which are actuators that minutely rotate the slider 2, the flexure 4 which retains the slider 2 and the piezoelectric elements 3 and which has a wire that conducts signals from the head element 2a arranged at the slider 2, the load beam 5 arranged to apply weight so as to allow the slider 2 to fly above the disk 301, and a base plate 6 arranged to firmly attach the load beam 5 with respect to the head support arm 302. Materials such PZT (Pb(Ti, Zr)O$_3$) (lead zirconate titanate); lead-free piezoelectric materials comprised of oxide solid solution including Ba (barium) and Ca (calcium); Ba(Ti$_{1-x}$Zr$_x$)O$_3$; (Ba$_{1-y}$M$_y$)TiO$_3$; (K, Na)NbO$_3$, for example, are used for the piezoelectric elements 3.

Figure 4A:
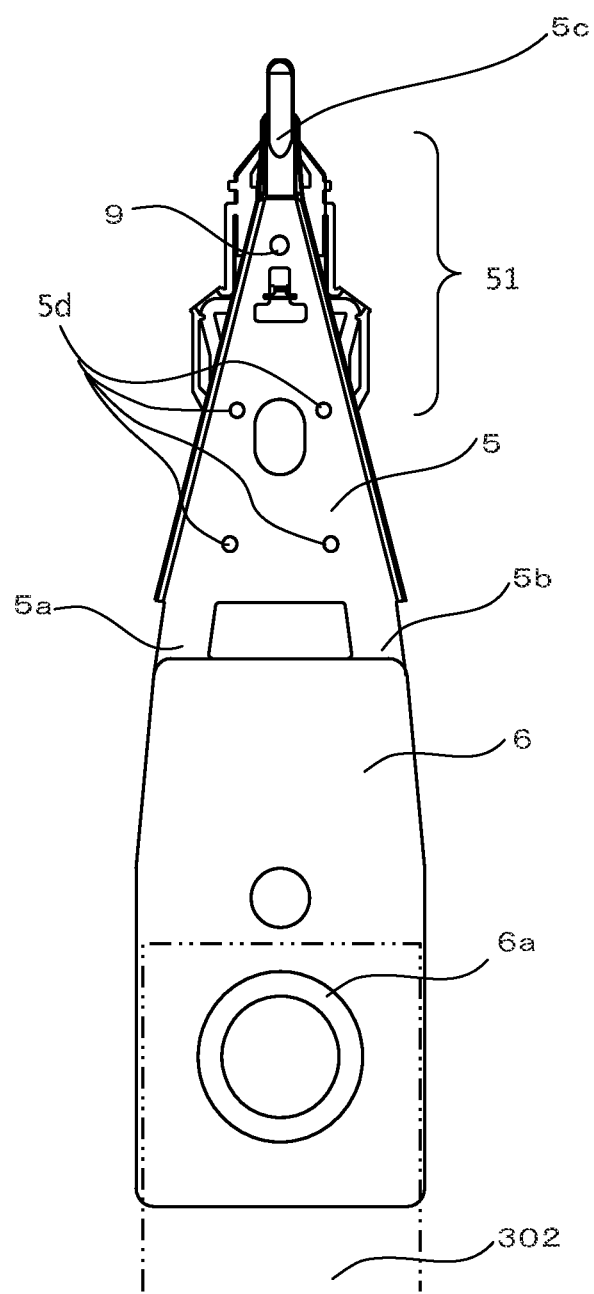
FIG. 4a is a plan view of the head support mechanism according to the first embodiment of the present invention.
Figure 4B:
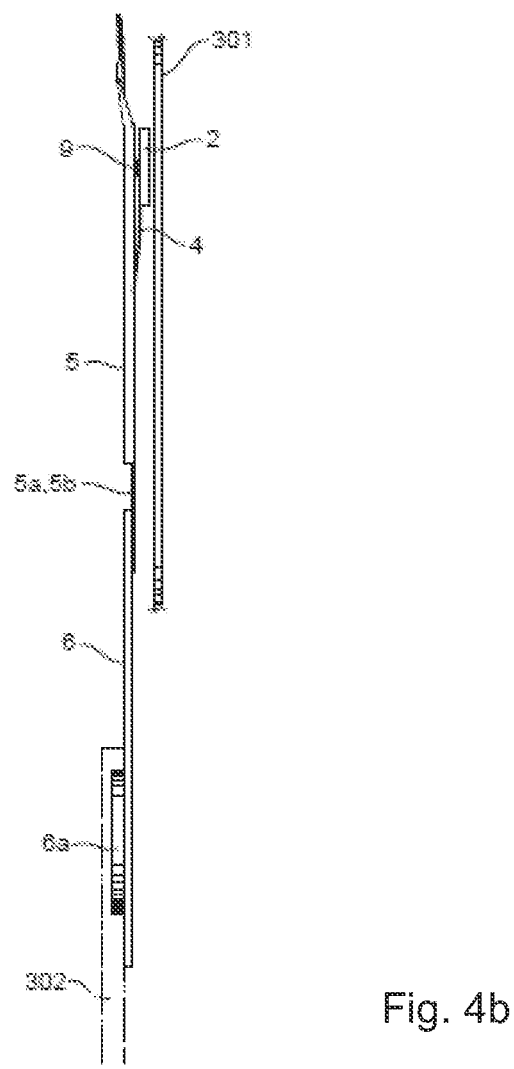
FIG. 4b is a side view of the head support mechanism according to the first embodiment of the present invention.

FIG. 4a is a plan view of the head support mechanism 1 as seen from the above with respect to a disk surface. FIG. 4b is a side view of the slider 2 flying above the disk 301. As illustrated in FIG. 4a, in the load beam 5 which is made of, for example, stainless steel, a pair of plain springs 5a and 5b are formed in an integrated manner. A spring force generated by the plain springs 5a and 5b generates a load for the slider 2 with respect to the disk 301. The flexure 4, which is made of, for example, stainless steel, is fixed at a lower surface of the load beam 5 via spot welds 5d (4 spots). The base plate 6 includes a press fit part 6a which is a portion of the base plate 6 drawn in a substantially circular shape. The press fit part 6a is mechanically press fitted to a hole arranged at the head support arm 302 to fix one another. The load beam 5 includes near the tip end part 51 a support projection 9 having a protruding shape (toward a disk surface). The slider 2 receives the load generated by the plain springs 5a and 5b at a vertex of the support projection 9, and flies above the disk 301 while the load and an air pressure generated at an air bearing surface (ABS) are being balanced. It is to be appreciated that the tip end part 51 of the load beam 5 described herein corresponds to a half region of the load beam 5 on the tab 5c side in its longitudinal direction.

Figure 4C:
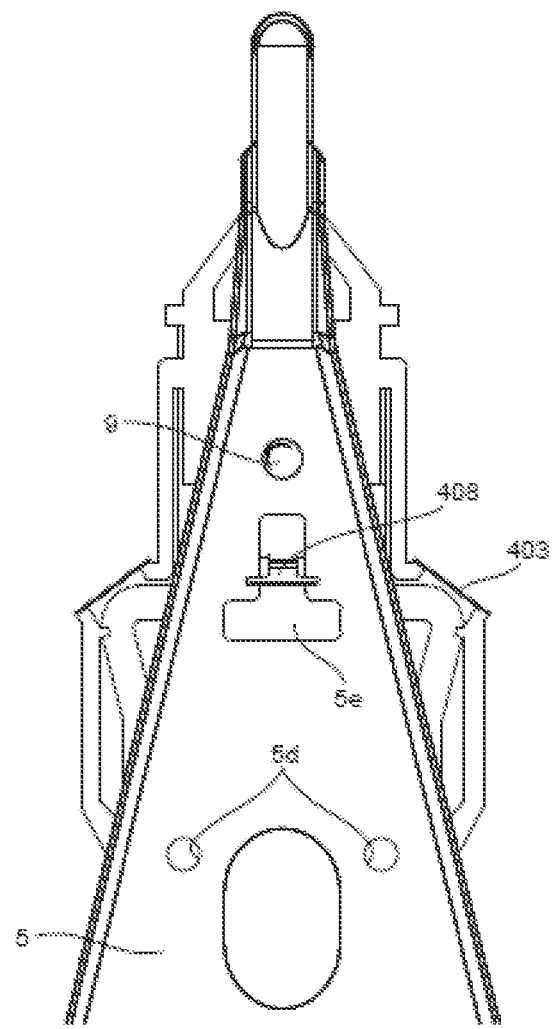
FIG. 4c is a plan view of a tip end part of the head support mechanism according to the first embodiment of the present invention.
Figure 4D:
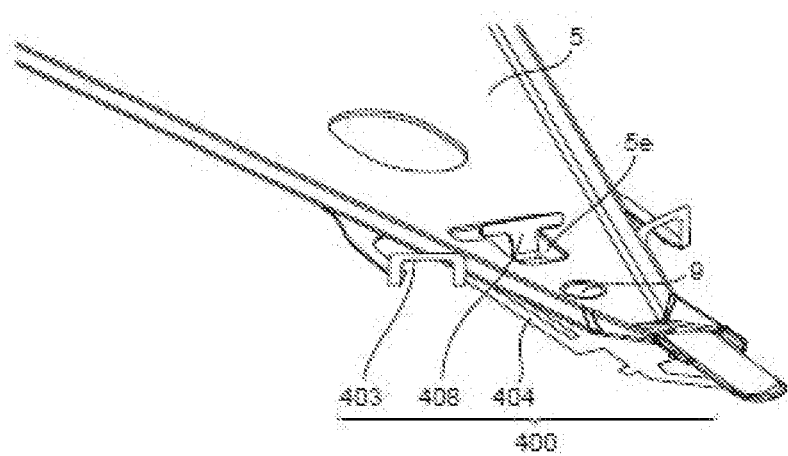
FIG. 4d is a perspective view of the tip end part of the head support mechanism according to the first embodiment of the present invention.

FIG. 4c is a plan view illustrating a tip end part of the head support mechanism 1 and the tip end part 51 of the load beam 5. FIG. 4d is a perspective view illustrating a tip end part of the head support mechanism 1 and the tip end part 51 of the load beam 5. The tip end part 51 of the load beam 5 includes a peculiar-shape hole 5e. A limiter 408 is a portion of a gimbal part 400, which is formed by cutting and raising a portion of the flexure 4, and is engaged to the load beam 5 via the hole 5e. When the magnetic disk device 300 transitions into a non-motion mode, the slider 2 is lifted upward from the disk 301, and the limiter 408 is arranged so as to pull up the slider 2 while countering a negative pressure which is generated at the air bearing surface (ABS) of the slider 2.

Figure 5:
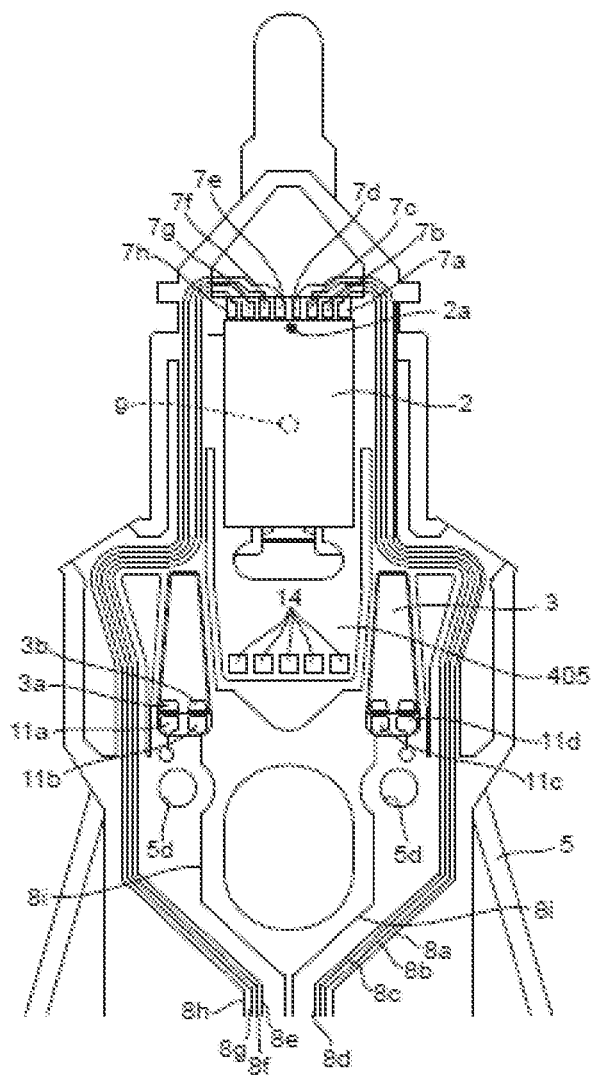
FIG. 5 is a plan view of a slider of the head support mechanism according to the first embodiment of the present invention as seen from an air bearing surface.
Figure 6:
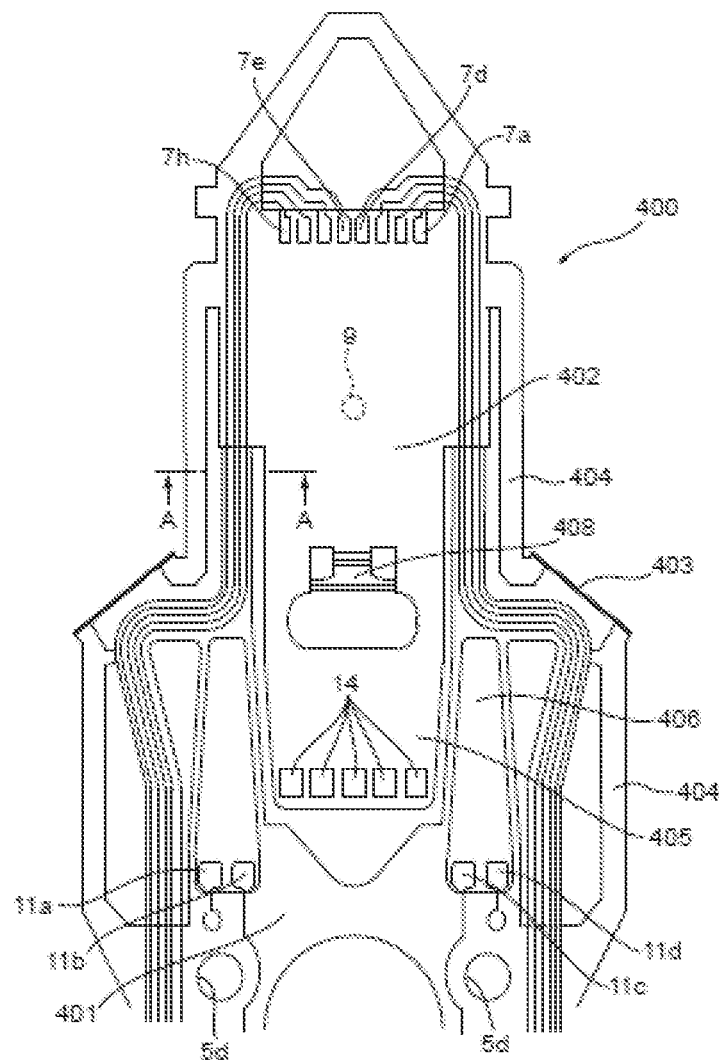
FIG. 6 is a plan view of the vicinity of a slider adhesion part of a flexure of the head support mechanism according to the first embodiment of the present invention.
Figure 7:
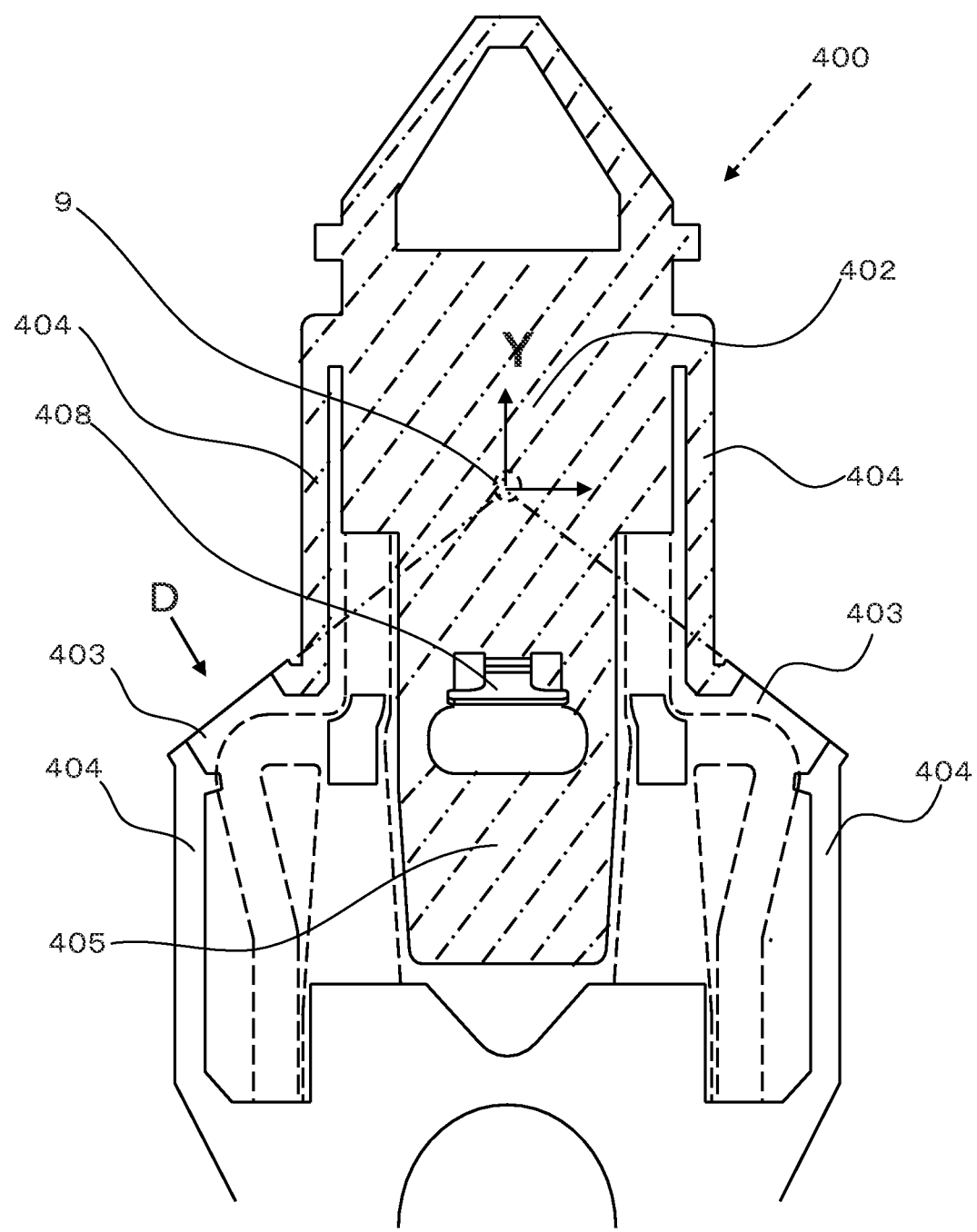
FIG. 7 is a plan view of a stainless configuration of the vicinity of the slider adhesion part of the flexure of the head support mechanism according to the first embodiment of the present invention.
Figure 9:
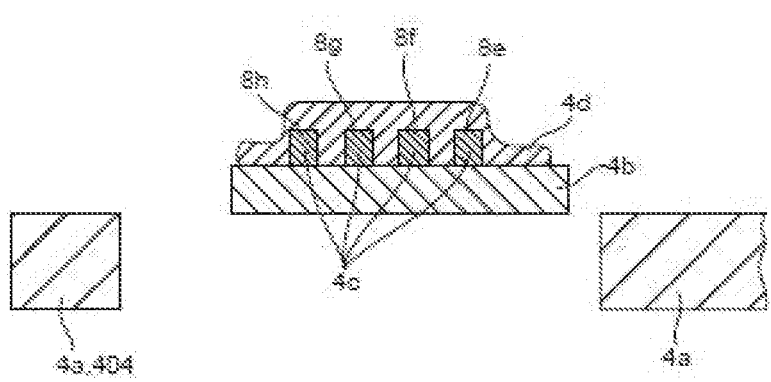
FIG. 9 is a cross sectional configuration view of the flexure of the head support mechanism according to the first embodiment of the present invention.

FIG. 5 is a view of a slider attachment portion of the head support mechanism 1 as seen from the air bearing surface (ABS) of the slider 2. FIG. 6 is a view illustrating the shape and structure of the slider attachment portion of the flexure 4 that is the head support mechanism 1 illustrated in FIG. 5 from which the slider 2 and the piezoelectric elements 3 are excluded. FIG. 7 is a view illustrating a shape of a stainless substrate 4a of the gimbal part 400 of the head support mechanism 1. FIG. 9 is a view of an A-A cross section of FIG. 6. The flexure 4 is configured by laminating an insulation layer 4b, a conductive layer 4c, and a cover layer 4d laminated on the stainless substrate 4a, and by processing into a predetermined shape by etching to have a wiring structure.

According to FIG. 5, the slider 2 adheres to the flexure 4 such that the support projection 9 is positioned at a figurative centroid of the air bearing surface. Further, the slider 2 includes at one side surface thereof a connection terminal (not illustrated) arranged to transfer and to receive signals to/from the head element 2a. The connection terminal is connected via a solder ball to pads 7a through 7h which are arranged at the flexure 4. The pads 7a through 7h are respectively connected to corresponding wires 8a through 8h, and the wires 8a through 8h extend toward an attachment base end of the head support mechanism 1. Electrodes 3a and 3b of the piezoelectric elements 3 are connected via a solder ball to piezoelectric actuation pads 11a and 11b, and to piezoelectric actuation pads 11c and 11d. It is to be noted that the piezoelectric actuation pads 11a and 11d are conducted via a through hole and grounded to the stainless substrate 4a of the flexure. The piezoelectric actuation pads 11b and 11c are respectively connected to wires 8i and 8j, and the wires 8i and 8j extend toward the base end of the head support mechanism 1.

The gimbal part 400 will be described referring to FIG. 7. The gimbal part 400 which is made of, for example, stainless steel includes a slider adhesion part 402, outriggers 404, and a counter balance 405, and corresponds to an area depicted with hatching. The gimbal part 400 is arranged such as to support the slider 2 in a revolvable manner around the support projection 9.

The slider adhesion part 402 is supported by a pair of the outriggers 404. Portions of the outrigger 404 nearer to the base end side of the head support mechanism 1 are firmly attached to the load beam 5 via a spot welding 5d (see FIG. 4a). The outrigger 404 is configured such as to allow the gimbal part 400 to freely change an orientation thereof pivoted about the support projection 9 using the elasticity of the outrigger 404. The gimbal part 400 is allowed to freely rotate about an X axis (pitch direction) and a Y axis (roll direction) via the outrigger 404.

Figure 8:
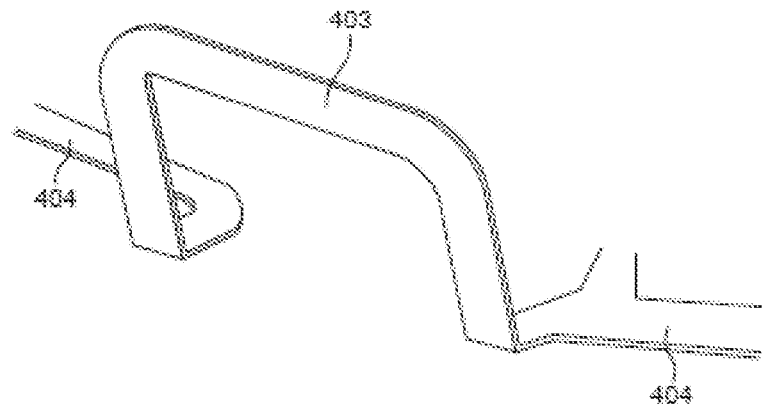
FIG. 8 is a perspective view of a link mechanism of the head support mechanism according to the first embodiment of the present invention.

FIG. 7 shows coordinates with the support projection 9 at a center thereof. At a center portion the outrigger 404, a link 403, which is a portion of the stainless substrate 4a, is formed, the portion being substantially perpendicularly bent. FIG. 8 is a view as seen from an arrow D indicated in FIG. 7. The structure is configured in a symmetric manner and such that an intersection of extension lines of right and left bent portions aligns with the support projection 9 or an area in the vicinity thereof. With such configuration, the gimbal part 400 is allowed to rotate about a Z axis (yoke direction).

The gimbal part 400 includes as a portion thereof the counter balance 405 such as to align a centroid of the gimbal part 400 with the support projection 9. The counter balance 405 includes at an end portion thereof a plurality of centroid adjustment pads 14. It is to be appreciated that the counter balance 405 is arranged aligned with a symmetric axis of the gimbal part 400 such that the centroid of the gimbal part 400 including the slider 2 is aligned with the support projection 9. Further, although a boundary between the gimbal part 400 and the counter balance 405 is not depicted in the figures, the counter balance 405 corresponds to an area in the −Y axis direction of the gimbal part 400 including the limiter 408 as shown in FIG. 7. FIG. 9 is the view of the cross section as seen from the line A-A depicted in FIG. 6. The centroid adjustment pads 14 are arranged on the counter balance 405 such as to adjust the centroid of the gimbal part 400. The conductive layer 4c of the lamination configuration of the flexure illustrated in FIG. 9 is exposed. The solder ball is arranged at the exposed area such as to perform the centroid adjustment so that the centroid of the revolving portion which includes the slider and the gimbal part is accurately aligned with the support projection 9. It should be noted that a material having a relative density used to align the centroid of the components described herein is not limited to solder, but may be, for example, a gold ball, a silver ball, or an adhesive having a large relative density. Further, it should be noted that the pads is not always needed to align along a straight line, but may be arranged on a predetermined position.

Further, the limiter 408 is arranged between the counter balance 405 and the slider adhesion part 402, the limiter 408 being as a portion of the gimbal part that is formed in a hook shape by being cut and raised. With such configuration, when the slider 2 is unloading, the slider 2 is allowed to counter the negative pressure generated at the air bearing surface (ABS) and be lifted upward from the disk 301.

Figure 10A:
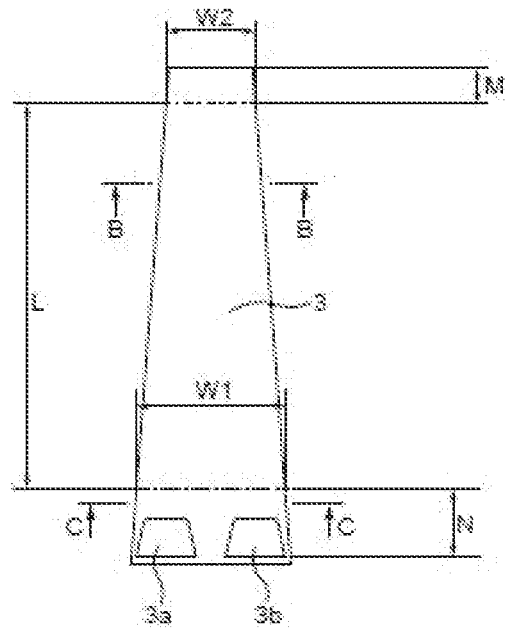
FIG. 10a is a plan view of a piezoelectric substance element of the head support mechanism according to the first embodiment of the present invention.
Figure 10B:
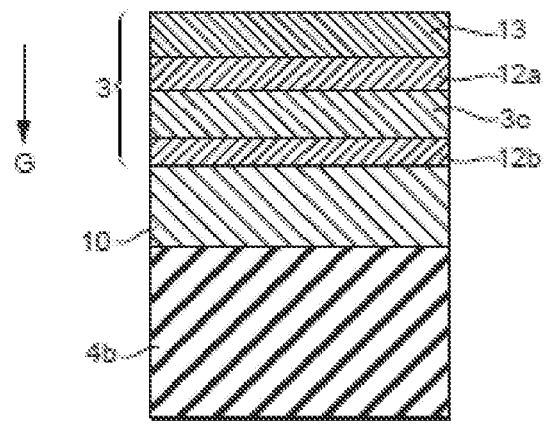
FIG. 10b is a cross sectional view of a central part of the piezoelectric substance element of the head support mechanism according to the first embodiment of the present invention.
Figure 10C:
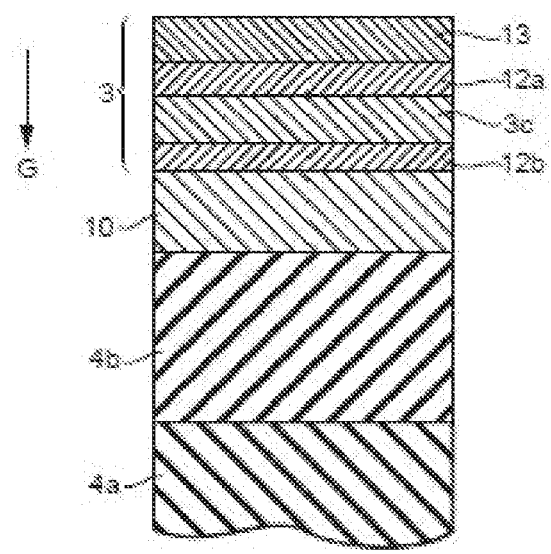
FIG. 10c is a cross sectional view of either one of both end portions of the piezoelectric substance element of the head support mechanism according to the first embodiment of the present invention.

FIG. 10a is a plain view of one of the piezoelectric elements 3. FIGS. 10b and 10c each illustrates a cross sectional structure of the piezoelectric element 3 tightly adhering to the flexure 4. The region of a length L of a central portion of the piezoelectric element 3 as illustrated in FIG. 10a has a structure illustrated in FIG. 10b which is a cross sectional view as seen from a line B-B depicted in FIG. 10a. Further, cross sectional structure of the regions of lengths M and N at both end portions of the piezoelectric element 3 is as illustrated in FIG. 10c. FIG. 10c is a view illustrating a cross section cut along a line C-C depicted in FIG. 10a, and herein the piezoelectric element 3 is disposed above the stainless substrate 4a. The piezoelectric element 3, according to FIG. 10b and FIG. 10c, is configured to adhere onto the insulation layer 4b via an adhesive 10. Also, the piezoelectric element 3 includes a piezoelectric material 3c having at upper and lower surfaces thereof thin film electrodes made of platinum, and a cover coat 13 covers a top surface of the piezoelectric element 3. A thin film electrode 12a is connected to the electrode 3a, and a thin film electrode 12b is connected to the electrode 3b. By applying voltage to the electrodes 3a and 3b, an electric field is applied to the piezoelectric material 3c in a lamination direction.

Hereinafter, motions of the head support mechanism 1 according to the first embodiment of the present invention will be described. When a voltage is applied to the thin film electrodes 12a and 12b to apply an electric field in a direction same as that of polarization of the piezoelectric material 3c, that is to say, in a direction of the lamination direction indicated by an arrow G, an effective length L region of the piezoelectric element 3 is contracted. On the other hand, when the electric field is applied in a direction opposite to that of the polarization of the piezoelectric material 3c, the effective length L region of the piezoelectric element 3 is expanded. Note that the direction of the polarization of the piezoelectric material 3c is indicated by the arrow G in FIG. 10b and FIG. 10c.

Figure 11:
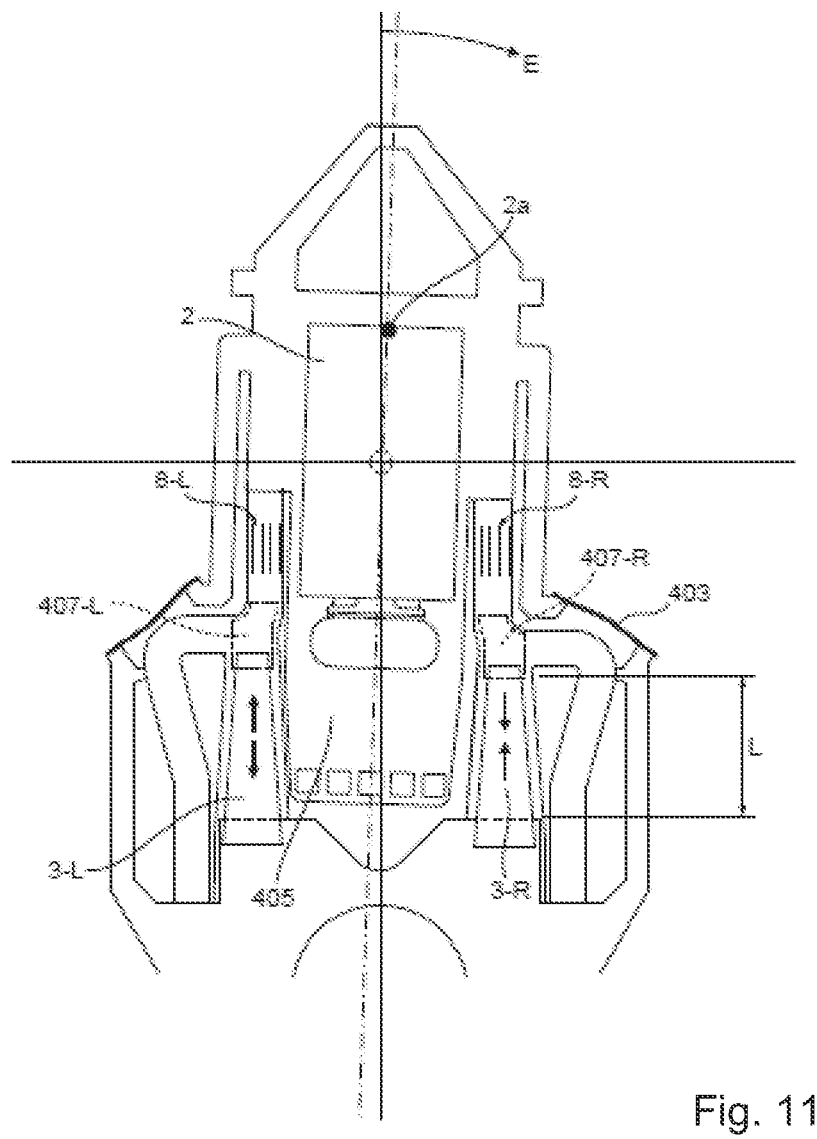
FIG. 11 is a motion view of the head support mechanism according to the first embodiment of the present invention.

FIG. 11 is a view illustrating the state of the expansion and contraction of the piezoelectric elements 3 as electric fields each having a direction different from one another is applied thereto. When the piezoelectric element 3 on the left (hereafter, referred to as a piezoelectric element 3-L) according to FIG. 11 expands, the wire 8-L is pushed via a reinforcement part 407-L. Meanwhile, when the piezoelectric element 3 on the right (hereafter, referred to as a piezoelectric element 3-R) according to FIG. 11 contracts, the wire 8-R is pulled via a reinforcement part 407-R. Note that the reinforcement parts 407-L and 407-R, which are portions of the stainless substrate 4a, are arranged to transfer displacements of the piezoelectric elements 3 to the wires 8-L and 8R.

Meanwhile, the slider 2 and the gimbal part 400 including the slider adhesion part 402, the outrigger 404, and the counter balance 405 revolve centering the support projection 9 via a link mechanism of the link 403 as depicted with an arrow E illustrated in FIG. 11. In the embodiment, it is necessary that the counter balance 405 is arranged aligned with the symmetric axis of the gimbal part 400 such that the centroid of the gimbal part 400 including the slider 2 is aligned with the support projection 9. By virtue of such configuration, an intersection (instantaneous center) formed by extension lines of a pair of the links 403 aligns with the support projection 9. When one of the piezoelectric elements 3 to which a voltage is applied is contracted and the other piezoelectric element 3 to which a voltage is applied is contracted by turns, the gimbal part 400 reciprocally revolves centering the support projection 9. Note that since the centroid of the whole portion of the revolving portion including the slider 2 and the gimbal part 400 aligns with the support projection 9, even when the gimbal part 400 reciprocally revolves, no reaction occurs to the load beam 5.

Figure 15A:
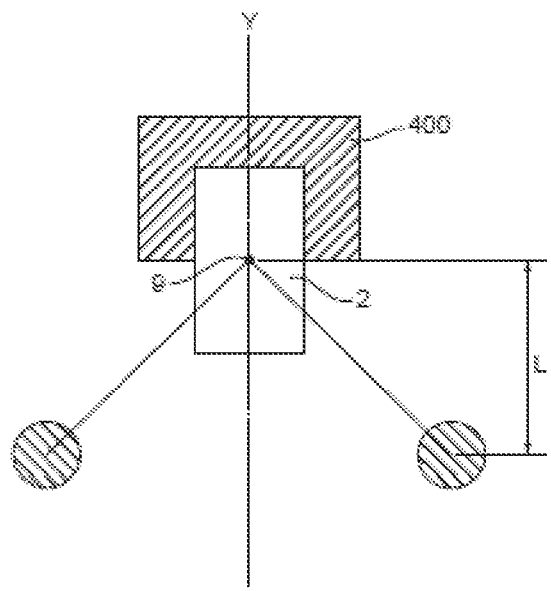
FIG. 15a is a schematic explanatory drawing illustrating effects of arranging the counter balance along a symmetric axis (Y axis).
Figure 15B:
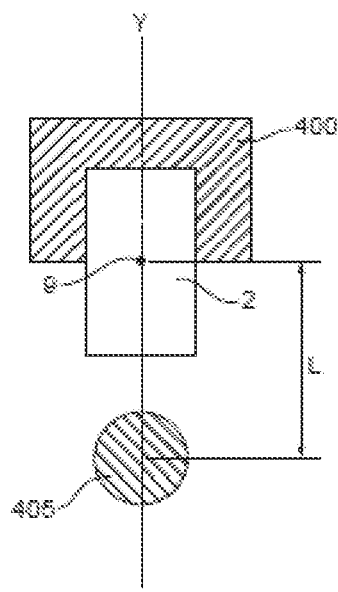
FIG. 15b is a schematic explanatory drawing illustrating effects of arranging the counter balance along the symmetric axis (Y axis).

Next, points to be considered with regard to minimize an inertial mass of the revolving portion will be described referring to FIGS. 15a and 15b. FIGS. 15a and 15b are explanatory drawings, each illustrating an effect obtained by arranging the counter balance 405 over the symmetric axis (herein referred to as "Y axis" to facilitate the understanding) of the gimbal part 400. FIG. 15a is a schematic view of a model of a conventional counter balance, shown in FIG. 12a, which is also disclosed in the above identified JP Laid-Open Patent Publication No. 2002-324374. Counter balances on both right and left sides are respectively arranged 45 degrees apart from the Y axis having the support projection 9 as a vertex, and m/2 of mass is applied to each of the right and left sides. On the other hand, FIG. 15b is a schematic view of a model of the counter balance according to the present embodiment. In order to maintain a balance with respect to the X axis, a mass m is applied along the symmetric axis ("Y axis") of the gimbal part 400. Note that in either case illustrated in FIG. 15a or FIG. 15b, due to the counter balance, the centroid is aligned with the support projection 9.

A moment of inertia of the conventional counter balance illustrated in FIG. 15a is (Inertia of Counter Balance)=$\sqrt{2} \times m \times L$.

A moment of inertia of the counter balance 405 according to the present first embodiment illustrated in FIG. 15b is (Inertia of Counter Balance)=$m \times L$.

Note that L represents a distance between the support projection and the counter balance arranged in consideration of a balance about the X axis. Consequently, the conventional counter balance is $\sqrt{2}$ times larger than the counter balance 405. Therefore, by arranging the counter balance 405 along the symmetric axis (Y axis) of the gimbal part, the inertial mass of the gimbal part is minimized, and the resonant frequency of a slider rotation mode of the slider 2 and the gimbal part 400 combined is increased.

Further, the configuration as illustrated in FIG. 15a is more likely to be influenced by a wind generated by a high speed rotation of the disk inside a hard disk drive. That is to say, due to the configuration in which the counter balance bulges outwardly to the left and to the right, the moment centered at the symmetric axis ("Y axis") of the gimbal part is more likely to be generated due to the wind, thereby potentially causing performance degradation in positioning the head due to unnecessary resonance. According to the present first embodiment, since the counter balance 405 is arranged along the symmetric axis of the gimbal part 400, a wind turbulence due to the moment centered at the symmetric axis of the gimbal part is less likely to occur.

Figure 12A:
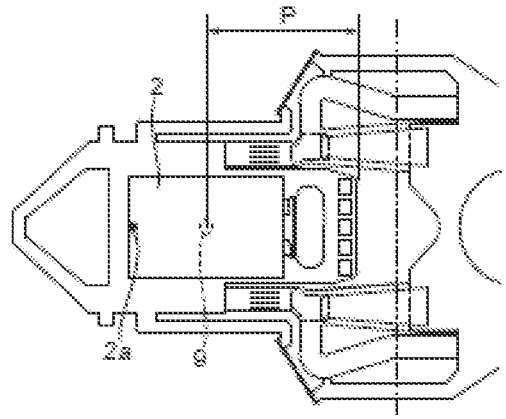
FIG. 12a is a comparative view for comparing models with various dimensions of a counter balance of the head support mechanism according to the first embodiment of the present invention.
Figure 12B:
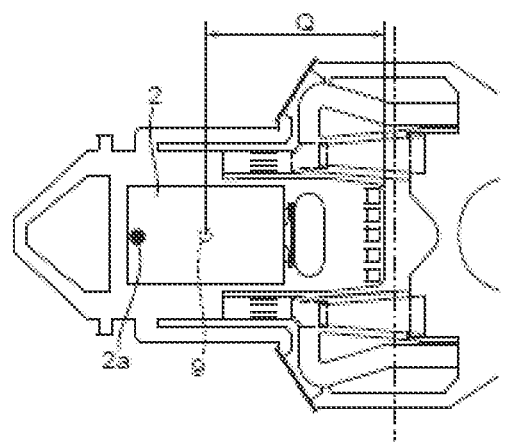
FIG. 12b is a comparative view for comparing the models with various dimensions of the counter balance of the head support mechanism according to the first embodiment of the present invention.
Figure 12C:
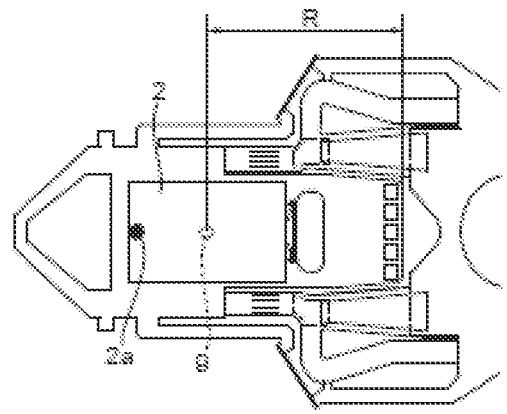
FIG. 12c is a comparative view for comparing the models with various dimensions of the counter balance of the head support mechanism according to the first embodiment of the present invention.

Hereafter, response characteristics of the head element 2a of the slider 2 in relation to a position for the centroid of the gimbal part 400 and the expansion and contraction actuation of the piezoelectric element 3 will be described. FIGS. 12a through 12c respectively show models of the counter balance 405, the models having different dimensions to each other. In FIG. 12a, a distance between an end of the counter balance 405 and the support projection 9 is indicated as P, the counter balance 405 being a portion of the gimbal part 400. In FIG. 12b, the same distance is indicated as Q. In FIG. 12c, the same distance is indicated as R. Note that according to the model illustrated in FIG. 12c, the centroid of the revolving portion which combines the slider 2 and the gimbal part 400 is aligned with the support projection 9. Also note that the relationship among the distances P, Q, and R between the end of the counter balance 405 and the support projection 9, is denoted as substantially P<<Q<R.

Figure 13A:
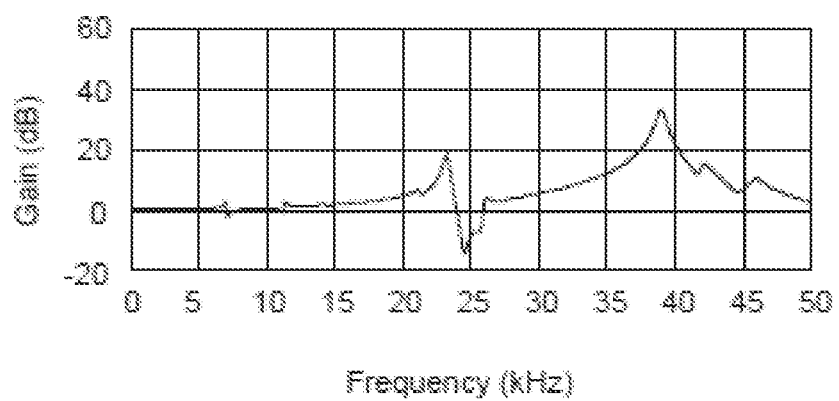
FIG. 13a is a graph of frequency response characteristics of the model (FIG. 12a) of the counter balance of the head support mechanism according to the first embodiment of the present invention.
Figure 13B:
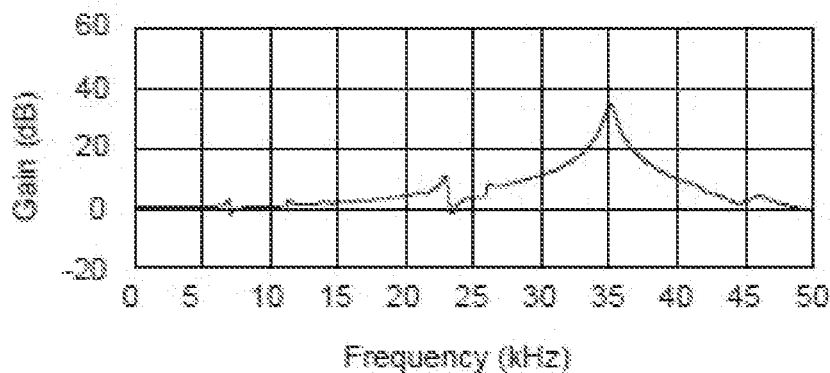
FIG. 13b is a graph of frequency response characteristics of the model (FIG. 12b) of the counter balance of the head support mechanism according to the first embodiment of the present invention.
Figure 13C:
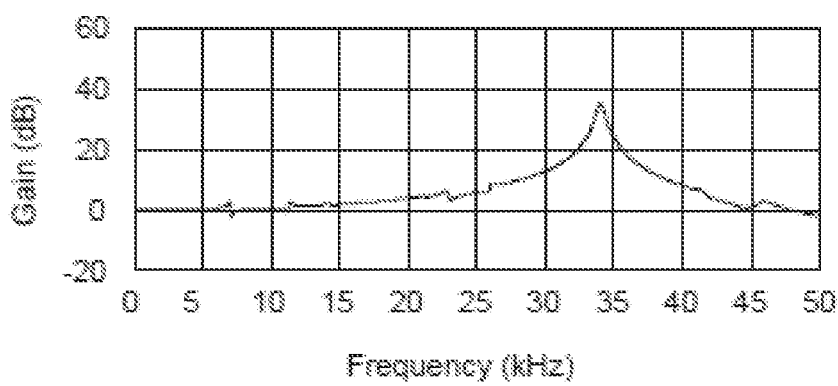
FIG. 13c is a graph of frequency response characteristics of the model (FIG. 12c) of the counter balance of the head support mechanism according to the first embodiment of the present invention.

FIG. 13a through FIG. 13c show the response characteristics of the head element 2a with respect to an actuation frequency which is generated when electric fields each having a direction different from one another is applied to the piezoelectric elements 3 on the left and right sides in the models. FIG. 13a illustrates the response characteristics of the model in which the distance between the end of the counter balance 405 and the support projection 9 is indicated as P. According to this model, the centroid of the revolving portion which combines the slider 2 and the gimbal part 400 is greatly shifted from the support projection 9 toward the head element 2a. Consequently, a large resonance occurs near 23.3 kHz. This resonance is indicated as a SWAY mode of the load beam 5 which is a natural mode thereof. Such characteristic indicates that the slider 2 does not follow signals when it is attempted to revolve the slider 2 at a frequency higher than a SWAY resonance point (23.3 kHz). Note that the SWAY mode refers a mode where an entire suspension resonates in a direction in which a head goes off track.

FIG. 13b illustrates the response characteristics of the model in which the distance between the end of the counter balance 405 and the support projection 9 is Q. Compared with the model illustrated in FIG. 13a, a weight of the counter balance of the model illustrated in FIG. 13b is greater, and thus a resonance level of the SWAY mode at 23.3 kHz is smaller. FIG. 13c illustrates the response characteristics of the model in which the distance between the end of the counter balance 405 and the support projection 9 is R. In this model, the centroid of the revolving portion which combines the slider 2 and the gimbal part 400 is aligned with the support projection 9. Therefore, even when the gimbal part 400 reciprocally revolves, no counterforce is applied to the load beam 5, and SWAY mode of the load beam 5, which is a natural mode thereof, at 23.3 kHz is not excited. That is to say, unnecessary vibration of the load beam is suppressed. By virtue of such configuration, the resonance at the resonant frequency of the load beam which is referred to as the SWAY mode is not excited, thereby suppressing unnecessary vibrations.

Figure 14A:
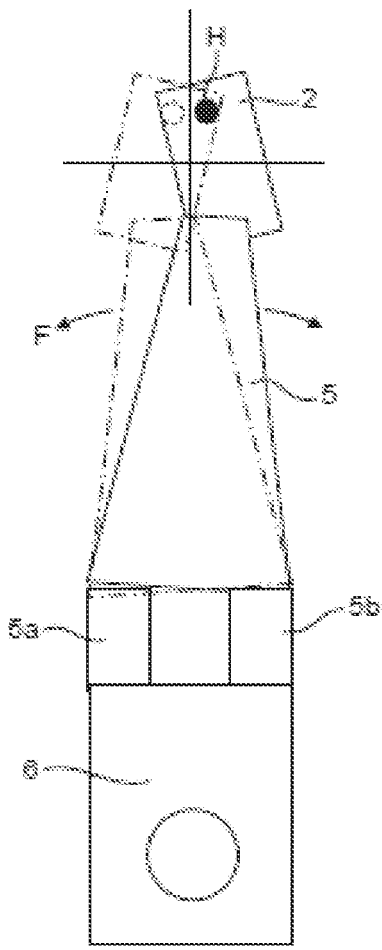
FIG. 14a is a schematic diagram illustrating motions of a SWAY mode of a load beam of the head support mechanism.
Figure 14B:
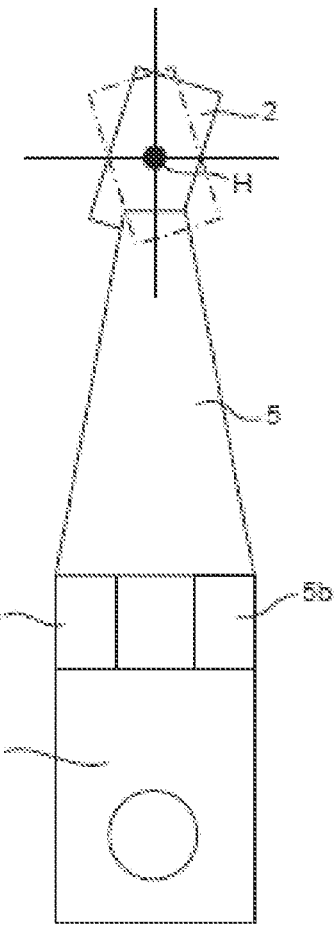
FIG. 14b is a schematic diagram illustrating motions of the SWAY mode of the load beam of the head support mechanism.

FIG. 14a is a schematic diagram illustrating motions (vibration in directions depicted by an arrow F) of the SWAY mode which is a natural mode of the load beam 5. Since the centroid H of the revolving portion which combines the slider 2 and the gimbal part 400 is out of alignment from the support projection 9 (center point of the slider 2 in FIGS. 14a and 14b), counterforce generated due to shifting of the centroid influences the plain springs 5a and 5b of the load beam, thereby swinging an entire load beam 5 in a left and right direction. On the other hand, according to the configuration illustrated in FIG. 14b, since the centroid H of the revolving portion which combines the slider 2 and the gimbal part 400 is in alignment with the support projection 9 (the center point of the slider in FIGS. 14a and 14b), no shifting of the centroid occurs. Therefore, since the counterforce does not influence the load beam 5, unnecessary vibrations of the load beam 5. Accordingly, by aligning the centroid H of the revolving portion which combines the slider 2 and the gimbal part 400 with the support projection 9, unnecessary vibrations of the load beam 5 is suppressed, and the frequency characteristics is improved.

Referring back to the frequency characteristics in FIG. 13a through FIG. 13c, at a domain of the frequency even higher than the above identified SWAY mode, a resonance point of a slider rotation mode is observed. According to FIG. 13a, in the model in which the distance between the end of the counter balance 405 and the support projection 9 is P, such resonance point is at 38 kHz. According to FIG. 13*b*, in the model in which the distance between the end of the counter balance 405 and the support projection 9 is Q, such resonance point is at 35 kHz. According to FIG. 13*c*, in the model in which the centroid is aligned with the support projection 9 and the distance between the counter balance 405 and the support projection 9 is R, such resonance point is at 34 kHz. Such resonance mode corresponds to rotating resonance of the revolving portion which combines the slider 2 and the gimbal part 400. Also, the smaller the inertial mass of the revolving portion is the higher the frequency of such resonance mode becomes. Accordingly, by aligning the centroid of the revolving portion which combines the slider 2 and the gimbal part 400 with the support projection 9, and by reducing the inertial mass of the gimbal part 400, frequency response characteristics which are comprehensively superior will be achieved.

By increasing the resonant frequency of the slider rotation mode which combines the slider and the gimbal part, an influence of the wind generated by the high speed rotation of the disk will be reduced compared to the conventional configuration while unnecessary resonance will be suppressed. The increase in the resonant frequency of the slider rotation mode which combines the slider and the gimbal part is achieved by reducing the inertial mass of the counter balance. In order to reduce the inertial mass, the present invention proposes that the counter balance should be arranged as described above. In actual practice, since an operation frequency while a slider revolves is operable only when the same is lower than the resonant frequency of the slider rotation mode which combines the slider and the gimbal part, increasing the resonant frequency allows the operation frequency to be increased, thereby achieving the high speed positioning of the magnetic head with respect to the magnetic disk.

What is claimed is:

1. A head support mechanism including a slider on which a head element is mounted is arranged at a tip end part of a load beam, the head support mechanism comprising:

a support projection arranged at the tip end part of the load beam;

a gimbal part including the slider and arranged to support the slider in a revolvable manner around the support projection;

a displacement member arranged to revolve the slider around the support projection; and a counter balance aligned along a symmetric axis of the gimbal part so as to align a centroid of the gimbal part including the slider with the support projection, wherein a centroid adjustment mechanism is arranged on the counter balance in order to adjust the centroid of the gimbal part, and the centroid adjustment mechanism includes a plurality of centroid adjustment pads that are independently arranged with respect to each other to apply a material having a large relative density onto the counter balance.

2. The head support mechanism according to claim 1, wherein the counter balance is a portion of the gimbal part.

3. The head support mechanism according to claim 1, wherein the material having the large relative density is solder.

4. The head support mechanism according to claim 1, wherein the displacement member includes a piezoelectric element arranged at an insulation layer of a flexure, and the displacement member allows the slider to revolve around the support projection by pushing or pulling a wire via a reinforcement part formed of a stainless substrate in accordance with displacements of the piezoelectric element.

5. The head support mechanism according to claim 1, wherein a limiter mechanism, which is arranged to lift the slider upward from a disk when the slider unloads, is a portion of the counter balance.

* * * * *